United States Patent
St John Cox et al.

(10) Patent No.: US 12,296,793 B2
(45) Date of Patent: May 13, 2025

(54) WIPER ASSEMBLY, SENSOR ASSEMBLY, VEHICLE AND METHOD

(71) Applicant: OXA AUTONOMY LTD, Oxfordshire (GB)

(72) Inventors: Paul St John Cox, Oxfordshire (GB); John Slater, Oxfordshire (GB)

(73) Assignee: OXA AUTONOMY LTD, Oxfordshire (GB)

( * ) Notice: Subject to any disclaimer, the term of this patent is extended or adjusted under 35 U.S.C. 154(b) by 0 days.

(21) Appl. No.: 18/701,545

(22) PCT Filed: Oct. 14, 2022

(86) PCT No.: PCT/GB2022/052618
§ 371 (c)(1),
(2) Date: Apr. 15, 2024

(87) PCT Pub. No.: WO2023/067311
PCT Pub. Date: Apr. 27, 2023

(65) Prior Publication Data
US 2024/0326756 A1    Oct. 3, 2024

(30) Foreign Application Priority Data

Oct. 18, 2021   (GB) ...................... 2114837

(51) Int. Cl.
*B60S 1/56*   (2006.01)
*B60S 1/08*   (2006.01)
(Continued)

(52) U.S. Cl.
CPC ............. *B60S 1/566* (2013.01); *B60S 1/0822* (2013.01); *B60S 1/18* (2013.01); *G02B 27/0006* (2013.01)

(58) Field of Classification Search
CPC . B08B 1/30; B08B 1/165; G01S 2013/33273; G02B 27/0006; B60S 1/56;
(Continued)

(56) References Cited

U.S. PATENT DOCUMENTS 10,442,402 B2 * 10/2019  Schmidt .................... B60S 1/52
10,589,726 B1    3/2020  Ingram et al.
(Continued)

FOREIGN PATENT DOCUMENTS

EP    3674151 A1    7/2020
EP    3763580 A1    1/2021
(Continued)

OTHER PUBLICATIONS

Patent Application No. GB2114837.4 Intention to Grant dated May 31, 2022, 2 pages.
(Continued)

*Primary Examiner* — Katina N. Henson
(74) *Attorney, Agent, or Firm* — Cozen O'Connor

(57) ABSTRACT

According to the present disclosure there is provided a wiper assembly for removing contaminants from a surface of a housing provided around a sensor, comprising: a drive system; a moveable part connected to the drive system to be driven by the drive system; and at least one wiper connected to the moveable part, wherein the drive system is configured to drive the moveable part, thereby to cause movement of the at least one wiper at least partially around the housing thereby to wipe the surface of the housing to remove contaminants therefrom. Further, according to the present disclosure there is provided: a sensor assembly comprising a sensor and a wiper assembly; a vehicle; and a method of operating a wiper assembly.

19 Claims, 6 Drawing Sheets

(51) Int. Cl.
*B60S 1/18* (2006.01)
*G02B 27/00* (2006.01)

(58) Field of Classification Search
CPC ...... B60S 1/32; B60S 1/62; B60S 1/18; B60S 1/0822; B60S 1/566
USPC .................................................... 15/250.003
See application file for complete search history.

(56) References Cited

U.S. PATENT DOCUMENTS

| | | | |
|---|---|---|---|
| 2014/0036132 A1* | 2/2014 | Pawlowski | B60S 1/0411 348/335 |
| 2016/0121855 A1 | 5/2016 | Doorley et al. | |
| 2016/0244028 A1 | 8/2016 | Wakatsuki | |
| 2017/0151933 A1 | 6/2017 | Doorley et al. | |
| 2020/0033592 A1* | 1/2020 | Crespo | B60R 11/04 |
| 2020/0094786 A1 | 3/2020 | Gilbertson et al. | |
| 2020/0142187 A1 | 5/2020 | Hu et al. | |
| 2020/0355808 A1* | 11/2020 | Albuquerque | B60S 1/544 |
| 2021/0009085 A1* | 1/2021 | Alcaide Hernández | G01S 17/931 |

FOREIGN PATENT DOCUMENTS

| | | |
|---|---|---|
| KR | 102290431 B1 | 8/2021 |
| WO | WO 2019105722 A1 | 6/2019 |
| WO | WO 2019105723 A1 | 6/2019 |

OTHER PUBLICATIONS

Patent Application No. GB2114837.4 Notification of Grant dated Jul. 19, 2022, 2 pages.
Patent Application No. GB2114837.4 Combined Search and Examination Report dated Nov. 9, 2021, 9 pages.
PCT/GB2022/052618 International Search Report and Written Opinion dated Jan. 19, 2023, 12 pages.

* cited by examiner

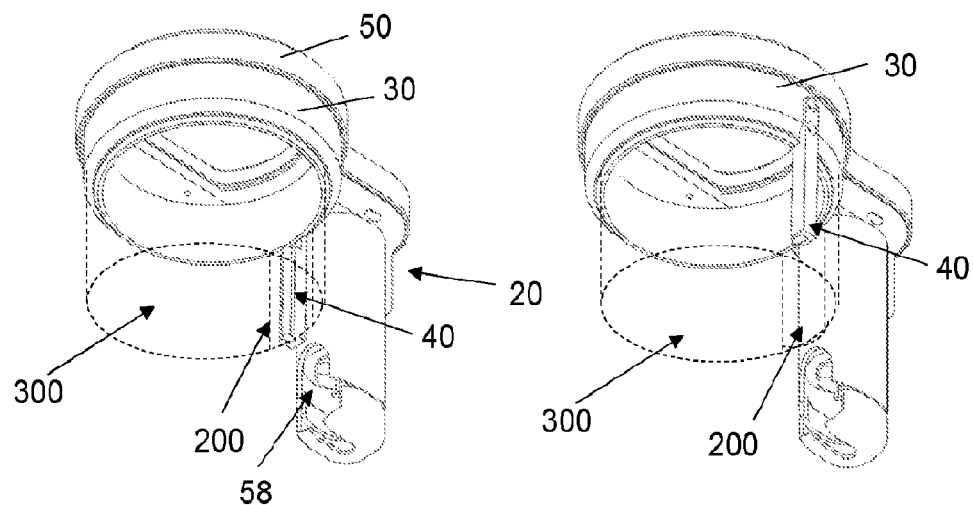
Fig. 5.1  Fig. 5.2
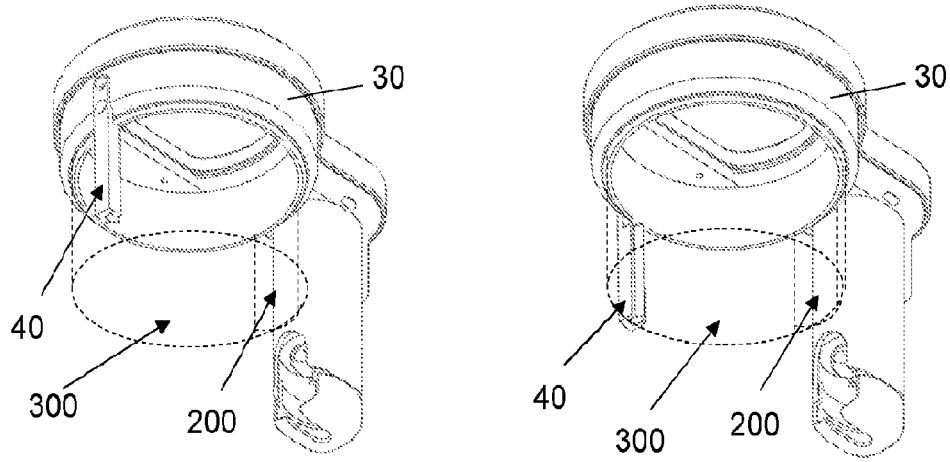
Fig. 5.3  Fig. 5.4

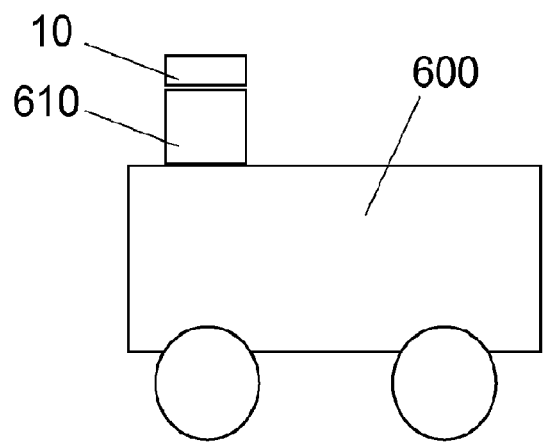
Fig. 6.1
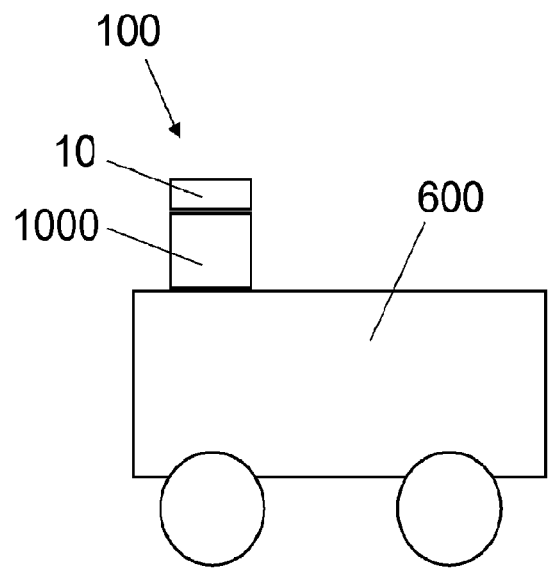
Fig. 6.2

WIPER ASSEMBLY, SENSOR ASSEMBLY, VEHICLE AND METHOD

FIELD

The present invention relates to a wiper assembly. In particular, the present invention relates to a wiper assembly for removing contaminants from a surface of a housing provided around a sensor. The present invention further relates to a sensor assembly comprising a sensor, and a wiper assembly.

BACKGROUND

A self-driving vehicle, also known as an autonomous vehicle (AV), is a vehicle that is capable of sensing its environment and moving safely with little or no human input. There are numerous challenges faced by the developers of AV technology.

In AV operation, sensors are used to sense the environment in which the AV operates. Information provided by the sensors, in conjunction with AV software, informs the operation of the AV. The sensors are located in a suitable position for this sensing, for example on the exterior of the AV. The sensors are therefore exposed to the environment.

During operation of the AV, for example whilst the AV is driving, contaminants may be deposited on the sensor and obstruct sensing. Contaminants include, for example, condensation, water droplets, dirt/dust, bug/insect matter, and ice/snow. Contaminants may cause degradation of sensor performance, thereby impacting safety or operation of the AV.

Where the sensor is a camera or other optical or image sensor, contaminants on the sensor can result in blind spots, reduced dynamic range, image distortion and dispersion (i.e. hazy images). Where the sensor is a Light Detection and Ranging (LIDAR) sensor, contaminants can cause blind spots, reduced ranging, and beam dispersion resulting in a flaring effect around retroreflectors such as road signs. Where the sensor is a radar, contaminants such as thick ice or mud can impact performance.

Existing solutions fail to sufficiently remove contaminants from sensors. For example, hydrophobic coatings and air/water sprays fail to sufficiently keep sensors clear of contaminants. Furthermore, existing solutions are complex.

It is an object of the present invention to provide an improved assembly and/or method and/or address one or more of the problems discussed above, or discussed elsewhere, or to at least provide an alternative assembly and/or method.

SUMMARY

According to a first aspect of the present invention, there is provided a wiper assembly for removing contaminants from a surface of a housing provided around a sensor, comprising: a drive system; a moveable part connected to the drive system to be driven by the drive system; and at least one wiper connected to the moveable part, wherein the drive system is configured to drive the moveable part, thereby to cause movement of the at least one wiper at least partially around the housing thereby to wipe the surface of the housing to remove contaminants therefrom.

In one example, the drive system is configured to drive the moveable part, thereby to cause movement of the at least one wiper to a parking region which does not interfere with a sensing function of the sensor.

In one example, the parking region corresponds with a dedicated region of the sensing function of the sensor which is not used for sensing. In one example, the parking region is a dedicated region of: the housing; and/or the path of movement of the at least one wiper, that is associated with the dedicated region of the sensing function of the sensor which is not used for sensing.

In one example, the moveable part is configured to be provided above the housing of the sensor and the at least one wiper extends downwardly from the moveable part.

In one example, the wiper assembly contains one wiper.

In one example, the at least one wiper is rigidly connected to the moveable part.

In one example, the moveable part extends in a first direction and the wiper extends in a second direction. In one example, the first direction is a horizontal direction in use and the second direction is a vertical direction in use.

In one example, the moveable part has the form of a ring.

In one example, the drive system is configured to cause the moveable part to perform a 360-degree rotation, thereby to cause movement of the at least one wiper completely around the housing thereby to wipe the surface of the housing to remove contaminants therefrom.

In one example, the wiper assembly comprises a first detector configured to detect an arrangement of the moveable part.

In one example, the wiper assembly further comprises a control system having a second detector for detecting the presence of contaminants on the sensor housing, the control system arranged to: control the drive system to drive the moveable part, thereby to cause movement of the at least one wiper, in response to a signal from the second detector indicating the presence of contaminants on the sensor.

According to a second aspect of the present invention there is provided a sensor assembly comprising: a sensor having a housing; and a wiper assembly according to the first aspect of the present invention.

In one example, the sensor is a sensor that is capable of emitting a first signal and receiving a second signal related to that first signal, in order to perform a sensing function. In one example, the sensor is a Light Detection and Ranging (LIDAR) sensor.

According to a third aspect of the present invention there is provided a vehicle comprising a wiper assembly according to the first aspect of the present invention or a sensor assembly according to the second aspect of the present invention. In one example, the vehicle is an at least partially autonomous vehicle.

In one example, the wiper assembly and/or sensor assembly is arranged to receive control signals for controlling the drive system, the control signals being provided by: the second detector of the first aspect of the present invention; a manual input provided at the vehicle, optionally by a user of the vehicle; and/or a further system provided at the vehicle to which the wiper assembly and/or sensor assembly is arranged to receive control signals from.

According to a fourth aspect of the present invention there is provided a method of operating a wiper assembly for removing contaminants from a surface of a housing provided around a sensor, the wiper assembly comprising: a drive system; a moveable part connected to the drive system to be driven by the drive system; and at least one wiper connected to the moveable part; and the method comprising: driving the moveable part, thereby to cause movement of the at least one wiper at least partially around the housing thereby to wipe the surface of the housing to remove contaminants therefrom.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

BRIEF DESCRIPTION OF THE FIGURES

Embodiments of the invention will now be described by way of example only with reference to the figures, in which:

FIG. 5 shows a lower perspective view of the wiper assembly of FIG. 2 with the wiper in various positions;

FIG. 6 shows a vehicle comprising a wiper assembly or a sensor assembly; and

DETAILED DESCRIPTION

The description which follows describes a sensor assembly comprising a sensor and a wiper assembly. The description further describes a wiper assembly for removing contaminants from a surface of a housing provided around a sensor. The term "wiper assembly" is used where the assembly is absent a sensor (i.e. not necessarily include a sensor, and/o=or housing for such a sensor). It will be understood that the wiper assembly is suitable for use with a sensor. In this way, it will be understood that the wiper assembly may be manufactured or sold separately to the sensor. That is, the wiper assembly may be manufactured in a different location to the sensor, or by a different manufacturer to that manufacturing the sensor. A sensor, for example a sensor fitted on an autonomous vehicle (AV), may be retrofitted with a wiper assembly according to the present invention. Additionally, it will be understood that an existing sensor assembly, for example a sensor assembly fitted on an AV, may be operated using a method according to the present invention.

Figure 1:
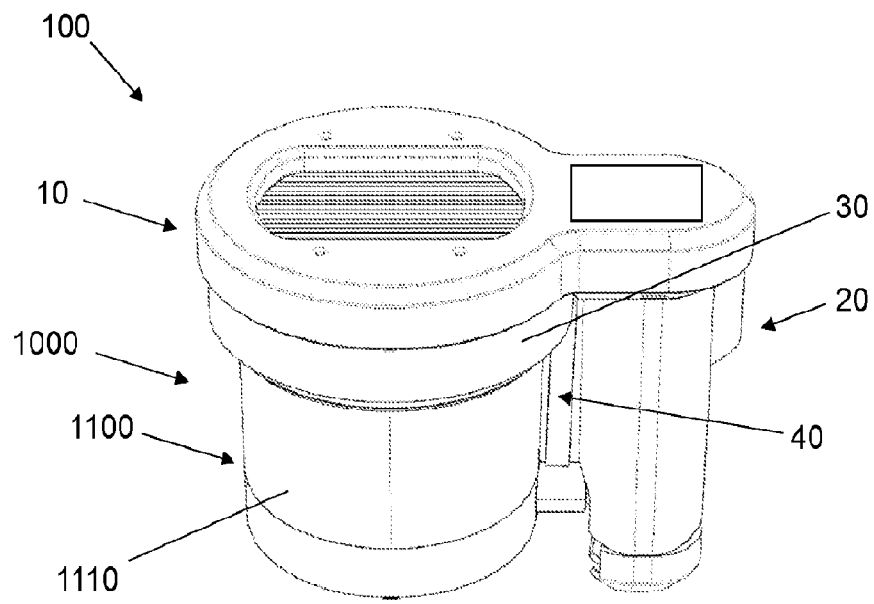
FIG. 1 shows a perspective view of a sensor assembly.

Referring to FIG. 1, a sensor assembly 100 is shown.

The sensor assembly 100 comprises a sensor 1000 having a housing 1100. The housing 1100 may be part of the sensor 1000. Alternatively, the housing 1100 may be an additional component provided to house the sensor 1000. The sensor 1000 is a sensor that is capable of emitting a first signal and receiving a second signal related to that first signal, in order to perform a sensing function. Suitable sensors may be known as "active sensors" or "ranging sensors". Exemplary sensors include cameras, LIDAR sensors and radars. The housing 1100 has a surface 1110 (that is, an outer surface) which is to be wiped by the wiper assembly, as will be explained in further detail below. As shown in FIG. 1, in this exemplary embodiment, the housing 1100 has a generally cylindrical form, and thus a circular cross-sectional profile. Wiping around the circumference of the housing 1100 may therefore mean wiping around the circular profile of the housing 1100 across the surface 1110. Wiping partially around the circumference of the housing 1100 may therefore mean partially wiping around the circular profile of the housing 1100 across the surface housing 1110.

In this example, the sensor assembly 100 further comprises a wiper assembly 10. The wiper assembly 10 is shown in isolation in FIGS. 2 and 3. It will be understood that the wiper assembly 10 is suitable for attachment to, or mounting on, the sensor 1000 to wipe the surface 1110 of the housing 1100 to remove contaminants therefrom. Highly advantageously, this ensures that the performance of the sensor 1000 is maintained, irrespective of weather or other environmental conditions. The sensor 1000 is kept clear of contaminants, by removing them from the surface 1110 of the housing 1100. The wiper assembly 10 is also a simple and robust construction.

Figure 2:
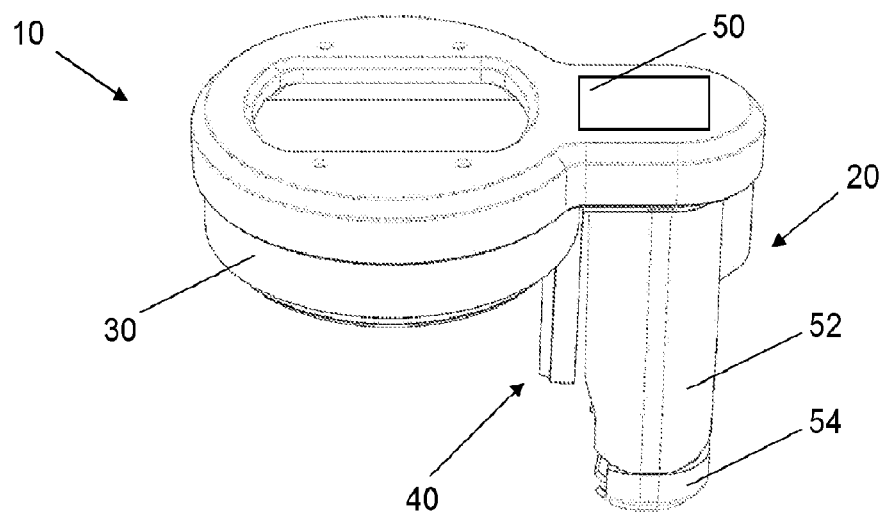
FIG. 2 shows a perspective view of a wiper assembly.
Figure 3:
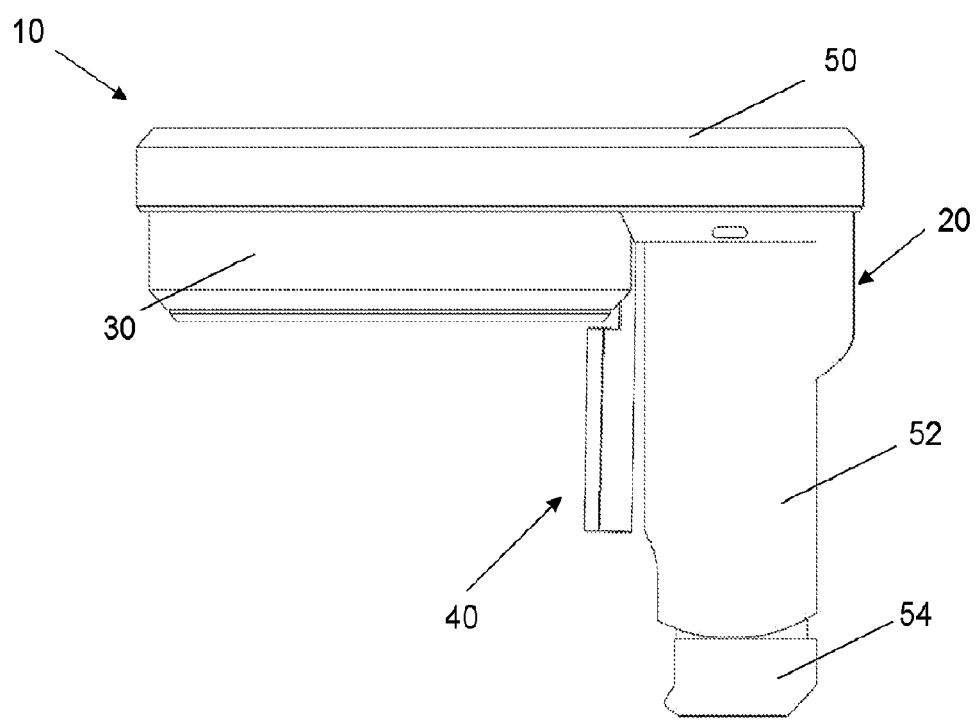
FIG. 3 shows a side view of the wiper assembly of FIG. 2.

Referring to FIGS. 2 and 3, the wiper assembly 10 comprises a drive system 20, a moveable part 30 and a wiper 40. FIGS. 2 and 3 show the external form of the wiper assembly 10. The wiper assembly 10 comprises a top cover 50, a motor cover 52 and a lower motor cap 54.

In the embodiment described, the wiper assembly 10 comprises one (that is, only a single) wiper 40. The provision of a single wiper 10 is advantageous in that the presence of the single wiper 40 can be more easily accounted for in the sensing software, in terms of any obstruction of sensing caused by the wiper 40 during use. Moreover, highly advantageous, the single wiper 10 can be parked in a dedicated region which is not used for sensing, which may not be possible where a plurality of sensors are present without impacting the ability to sense or image the environment. Moreover, a single wiper has been found to be sufficient for removing contaminants in the context of the present wiper assembly 10, and also simplifies construction. However, in alternative embodiments, the wiper assembly 10 may comprise a plurality of wipers. A plurality of wipers may be beneficial in improving removal of contaminants removable from the surface in extreme weather conditions but will increase the complexity of construction of the wiper assembly 10.

Figure 4:
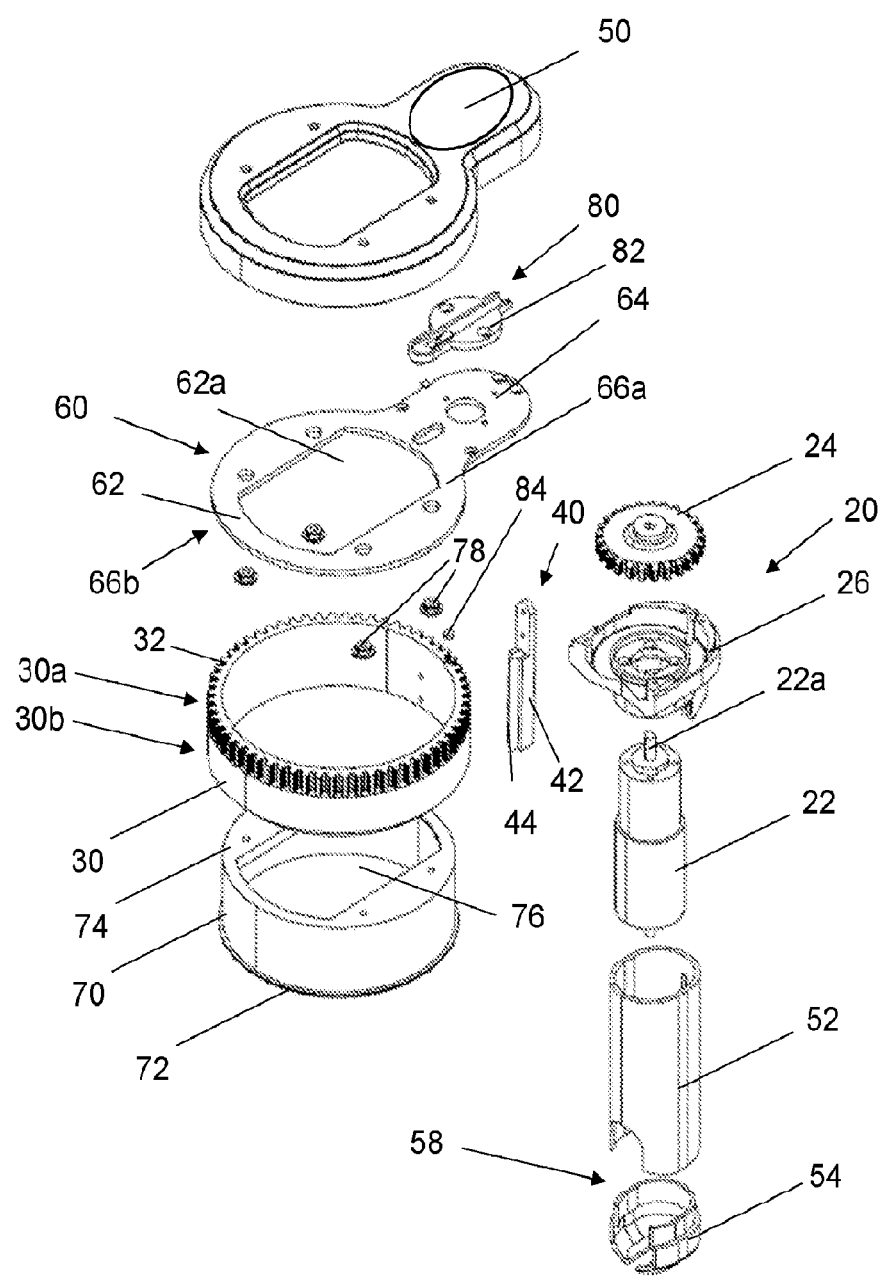
FIG. 4 shows an exploded view of the wiper assembly of FIG. 2.

Referring to FIG. 4, an exploded view of the wiper assembly 10 is shown. The exploded view further illustrates the internal componentry of the wiper assembly 10.

The wiper assembly 10 comprises a mounting plate 60, which may alternatively be referred to as a top plate. The mounting plate 60 comprises a head 62 and a neck 64. The head 62 comprises an aperture 62a through which an upper part of the sensor 1000 is receivable. The neck 64 extends away from the aperture, such that when the sensor assembly 100 is assembled the neck 64 extends away from the sensor 1000. The mounting plate 60 has an upper face 66a and a lower face 66b.

The drive system 20 comprises a motor 22 and a drive gear 24. The motor 22 comprises a drive shaft 22a. When the drive system 20 is assembled, the drive shaft 22a is operably connected to the drive gear 24 to cause the drive gear 24 to rotate. A motor mount 26 is provided between the motor 22 and the drive gear 24. The drive shaft 22a extends through the motor mount 26. The motor mount 26 mounts the drive system 20 at the lower face 66b of the neck 64 of the mounting plate 60.

The motor cover 52 covers the motor 22 and the lower motor cap 54 is provided at the lower end of the motor cover 52 to encase the motor 20. An aperture 58 is defined by the motor cover 52 and lower motor cap 54. The aperture 58 provides a mounting point for the sensor 1000 in the sensor assembly 100.

The moveable part 30 is in the form of a circular ring 30. The ring 30 comprises a first, upper, region 30a and a second, lower, region 30b. The first region 30a and second region 30b each extend around the perimeter of the ring. The moveable part 30 having the form of a ring is advantageous in simplifying construction, use and maintenance of the wiper assembly 10—a single, robust element is useable to implement movement of the wiper 40. Moreover, the ring form of the moveable part 30 is advantageous in wiping a housing 1100 having a cylindrical form (or even conical, or more generally a shape with a circular circumference).

The first region 30a comprises gear teeth 32. The gear teeth 32 are arranged (i.e. shaped and sized) to be engaged with the drive gear 24 when the wiper assembly 10 is assembled. That is, the moveable part 30 is connectable to the drive system 20 to be driven by the drive system 20. The second region 30b is absent gear teeth.

The wiper 40 comprises a wiper body 42 (or "wiper arm") and a wiper blade 44. The wiper body 42 comprises a finger portion 44 for connection to the lower region 30b of the moveable part 30. The wiper body 42 comprises a receiving portion 46, extending downwardly from the finger portion 44, for receiving the wiper blade 44. When assembled, the wiper 40 is connected to the moveable part 30 by the finger portion 44. The wiper blade 40 and receiving portion in which the wiper blade 40 is received extend downwardly from the moveable part 30. The wiper 40 is directly connected to the moveable part 30. That is, there are no intermediary components between the wiper 40 and moveable part 30, and thus construction is simplified. The wiper 40 is rigidly connected (at the finger portion 44) to the moveable part 30. In this way, construction is simplified when compared with, for example, a non-rigid (e.g. hinged) connection, and contact with the surface 1110 of the housing 1100 of the sensor 1000 is ensured entirely around the perimeter by virtue of the rigid connection.

An inner ring 70 is provided to support the moveable part 30 and mount the moveable part 30 in the wiper assembly 10. The inner ring 70 comprises a flange 72 for supporting the moveable part 30 whilst allowing the moveable part 30 to rotate thereon. The inner ring 70 comprises an upper surface 74 having an aperture 76 which corresponds with the aperture 62a of the mounting plate 60, through which an upper part of the sensor 1000 is receivable. In assembling the wiper assembly 10, the inner ring 70 is inserted through the moveable part 30 such that the lower region 30b is supported on the flange 72 and is free to rotate thereon. The upper surface 74 of the inner ring 70 is mounted to the lower face 66b of the mounting plate 60. Spacers 78 provide separation between the mounting plate 60 and inner ring 70, when mounted, such that the moveable part 30 does not contact the mounting plate 60. The moveable part 30 is free to rotate on the flange 72.

With the drive system 20 mounted to the mounting plate 60 via motor mount 26, and the moveable part 30 mounted to the mounting plate 60 via inner ring 70, the drive gear 24 of the drive system engages the gear teeth 32 of the moveable part 30. Thus, the drive system 20 is configured to drive the moveable part 30, thereby to cause movement of the wiper 40. In exemplary embodiments, the drive system 20 is configured to drive the moveable part 30, thereby to cause movement of the wiper 40 at least partially around the housing 1100 thereby to wipe the surface 1110 of the housing 1100 to remove contaminants therefrom. In this exemplary embodiment, the drive system 20 is configured to drive the moveable part 30 to cause movement of the wiper 40 completely around (that is, 360° around, by virtue of the cylindrical shape, and circular cross-sectional profile) the sensor housing 1100. That is, the drive system 20 is configured to rotate the moveable part 30. In this way, the wiper 40 is caused to follow a circular arc, or path. This is highly beneficial in wiping a sensor housing 1110 having a cylindrical profile and vertical (that is, parallel to the vertical wiper blade 44) sides.

As will be apparent from the description of the mounting of the moveable part 30 to the mounting plate 60, and the apertures provided therein, the moveable part 30 is configured to be provided above the housing 1100 of the sensor 1000. The wiper 40 extends downwardly from the moveable part 30. Here, the wiper 40 extends vertically downward from the moveable part 30, when the wiper assembly 10 is assembled. The moveable part 30 extends horizontally when the wiper assembly 10 is assembled. That is, the moveable part 30 extends in a first direction and the wiper 40 extends in a second direction, the first direction being a horizontal direction in use and the second direction being a vertical direction in use. This leads to a simpler construction of the wiper assembly 10. Moreover, such a configuration is advantageous for wiping a cylindrical housing—that is, a housing 1100 having a vertical side surface 1110.

Providing the moveable part 30 above the housing 1100 is advantageous as the moveable part 30, and other components (e.g. the top cover and inner ring 70), somewhat shelter the housing from contaminants, for example from falling rain. Moreover, the moveable part 30 above the housing 1100 facilitates the wiper 40 extending downwardly therefrom. The wiper 40 extending downwardly from the moveable part 30 is advantageous as the wiper 40 can hang from the moveable part 30, which is a simplified construction compared with, for example, a wiper being supported to extend upwardly. Moreover, the wiper extending downwardly may negate the requirement to use a wiper 40 to extend the full height of the housing 1100, as the run-off from wiping the housing 1100 using the wiper 40 may remove contaminants from a lower, un-wiped, region of the housing 1100 of the sensor 1000. Furthermore, the wiper 40 is also sheltered, or shielded, by components above, such as the moveable part 30, such that contaminants incident on the wiper assembly 10 from above do not contact the wiper 40, thereby preventing the wiper 40 from inadvertently wiping dirt/grit into the surface 1110 of the housing 1100 which may cause damage (e.g. scratches) thereto.

The wiper assembly 10 further comprises a detector 80 configured to detect an arrangement or configuration (e.g. a position, or orientation) of the moveable part 30. This may be useful in driving the wiper 40, or taking account movement of the wiper in a field of view of the sensor, for example synchronising an image filter or process. In this example, the detector 80 is a Hall effect sensor comprising a sensor part 82 and a magnet 84. The sensor part 82 is mounted on upper face 66a of the neck 64 of the mounting plate 60. The magnet 84 is provided on the moveable part 30. The sensor part 82 senses when the magnet 84 is in proximity, and thus advantageously allows the arrangement (e.g. location or position) of the moveable part 30 to be determined. That is, the first detector 80 is configured to detect a first arrangement of the moveable part 30 at a first time, and a second arrangement of the moveable part 30 at a second time, thereby to establish that the moveable part has performed a full 360° rotation. The first arrangement and second arrangement may be an arrangement where the magnet 84 is in proximity. A period of time will pass between the time when the moveable part 30 is in the first arrangement and the second arrangement whilst the moveable part 30 is rotating, by being driven by the drive system 20.

The wiper assembly 10 further comprises a control system (not shown). Alternatively, the control system may form part of the sensor assembly 100. The control system comprises a second detector for detecting the presence of contaminants on the sensor housing 1100, specifically on the surface 1110 of the housing 1100. The second detector may comprise a camera for imaging the sensor housing 1100. The second detector may provide an indication when the level of contaminants present on the surface 1110 exceeds a threshold level which is determined to interfere with the sensing function of the sensor 1000. That is, excessive water deposition on the sensor 1000 may be determined and the second detector may indicate this to the control system. The control system is arranged to control the drive system 20 in response to this signal from the second detector. The control system is arranged to control the drive system 20 to drive the moveable part 30, thereby to cause movement of the wiper 40, to wipe the surface 1110, in response to the signal from the second detector indicating the presence of contaminants (e.g. above a threshold level) on the sensor 1000. In this way, the control system and second detector may advantageously ensure that high sensing performance of the sensor 1000 is maintained, thus ensuring improved AV safety.

In one example, the second detector could form part of, or even be, the sensor 1000. For instance, a change in sensing functionality of or by the sensor may be used to determine the presence of, or an amount of, contaminants.

The top cover 50 is provided over the top of the mounting plate 60 and sensor part 82. The top cover 50 comprises a form corresponding to that of the mounting plate 60. That is, the top cover 50 comprises a head 56 and a neck 58. The head 56 comprises an aperture 56a.

Referring to FIG. 5, movement of the wiper 40 (by virtue of the drive system 20 driving, to rotate, the moveable part 30) is shown. Various stages of the movement of the wiper 40 are shown, as described herein.

FIG. 5.1 shows the wiper 40 located in a parking region 200. The wiper 10 can be determined to be in, or moved to, the parking region 200 using functionality of the detector 80. In locating the wiper 40 in the parking region 200, the drive system 20 is configured to drive the moveable part to cause movement of the wiper 10 to the parking region 200. The parking region 200 is a region which does not interfere with a sensing function of the sensor 1000. That is, the wiper assembly 10 is configured such that with the sensor 1000 installed, the wiper 40 being located in the parking region 200 does not interfere with the sensing function of the sensor 1000. Furthermore, as shown in the figures, the drive system 20 is also located at least partially in the parking region 200. Advantageously, in this way the drive system 20 also does not interfere with the sensing function of the sensor 1000, or has a minimal impact thereon. The parking region 200 is a region in which the wiper is located in an inoperative state of the wiper assembly 10.

The parking region 200 may be a region in which the sensor 1000 cannot sense. Alternatively, the parking region 200 may be a region which the sensor 1000 can sense but is instructed (e.g. programmed) not to do so. Alternatively, the parking region 200 may be a region which the sensor 1000 can sense and does sense but the signal from the parking region 200 is ultimately ignored (e.g. in subsequent processing of the data provided by the sensor 1000).

In one exemplary embodiment, the parking region 200 corresponds with a dedicated region of the sensing function of the sensor 1000 which is not used for sensing. In this way, the wiper 40 when located or positioned in the parking region 200, does not impact or interfere with the sensing function of the sensor 1000. That is, high performance of the sensor 1000 is maintained by parking the wiper 40 in the parking region 200 corresponding with said dedicated region. The parking region 200 is a dedicated region of: the housing and/or the path of movement of the wiper 40, that is associated with the dedicated region of the sensing function of the sensor 1000 which is not used for sensing.

An example of a dedicated region of the sensing function of the sensor 1000 which is used for sensing is illustrated at 300. This region may be referred to as an "operative region 300" of the sensing function.

FIG. 5.2 shows the wiper 40 moved out of the parking region 200 and into the operative region 300. This is achieved by the drive system 20 driving the moveable part 30. In the figure, the moveable part 30 has been rotated by 90° from the position shown in FIG. 5.1. When the wiper assembly 10 is provided as part of the sensor assembly 100, moving the wiper 40 in this way wipes a first quarter region of the surface 1110 of the housing 1100 of the sensor 1000.

FIG. 5.3 shows the wiper 40 in the operative region 300. The moveable part 30 has been rotated by 180° from the position shown in FIG. 5.1. When the wiper assembly 10 is provided as part of the sensor assembly 100, moving the wiper 40 in this way wipes a first half region of the surface 1110 of the housing 1100 of the sensor 1000.

FIG. 5.4 shows the wiper 40 in the operative region 300. The moveable part 30 has been rotated by 270° from the position shown in FIG. 5.1. When the wiper assembly 10 is provided as part of the sensor assembly 100, moving the wiper 40 in this way wipes three quarters of the surface 1110 of the housing 1100 of the sensor 1000.

From the position shown in FIG. 5.4, the moveable part 30 is rotated a further, final, 90° to return the wiper to the parking region 200 and the position shown in FIG. 5.1. In this way, when the wiper assembly 10 is provided as part of the sensor assembly 100, the wiper 40 has wiped the full surface 1110 of the housing 1100. The return of the wiper 40 to the parking region 200 may be determined by the first detector 80, that is, the Hall effect sensor 82 and magnet 84.

Referring to FIG. 6, a vehicle 600 is shown. The vehicle 600 is an at least partially autonomous vehicle. As shown in FIG. 6.1, the vehicle 600 comprises a wiper assembly 10. The wiper assembly is retrofitted to an existing sensor 610 provided on the vehicle 600. Retrofitting an existing sensor 610 with a wiper assembly 10 is highly advantageous as the safety and performance of the vehicle 600 may thereby by improved. Sensor functionality is also improved, as the wiper assembly 10 can remove contaminants from the sensor.

Alternatively, as shown in FIG. 6.2, the vehicle 600 comprises a sensor assembly 100 comprising a wiper assembly 10 and sensor 1000.

The wiper assembly 10, or sensor assembly 100, is arranged to receive control signals for controlling the drive system 20. The control signals may be provided by the second detector for detecting the presence of contaminants on the sensor housing 1100. The control signal may be an indication that the level of contaminants on the sensor housing 1100 is above a threshold level, and thus an instruction to cause the wiper assembly 10 to wipe the surface 1110 of the housing 1100. In this way, high performance of the sensor is ensured. Alternatively, or additionally, the control signal may be provided by a manual input provided at the vehicle 600. For example, the control signal may be provided by a button press by a user of the vehicle. The vehicle operator thereby has full control over the operation of the wiper assembly 10. Alternatively, or additionally, the control signal may be provided by a further system provided at the vehicle to which the wiper assembly 10 and/or sensor assembly 100 is arranged to receive control signals from. For example, the further system may be a windscreen wiper system provided at the vehicle 600. That is, the wiper assembly 10 may make use of existing control signals in the vehicle 600. For example, where the windscreen wiper system detects rain or water on the windscreen, the windscreen wiper system may be controlled to wipe the windscreen, and the wiper assembly 10 may also (e.g. simultaneously) be controlled to wipe the sensor 1000.

Figure 7:
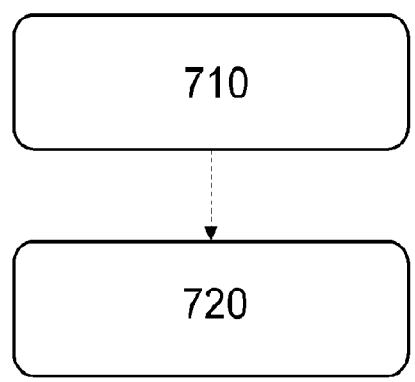
FIG. 7 shows general methodology principles.

Referring to FIG. 7, a method of operating a wiper assembly 10 for removing contaminants from a surface of a housing 1100 provided around a sensor 1000 is shown. The wiper assembly 10 comprises: a drive system 20; a moveable part 30 connected to the drive system 20 to be driven by the drive system 20; and at least one wiper 40 connected to the moveable part 30. Step 710 comprises driving the moveable part 30, thereby to cause movement of the at least one wiper at least partially around the housing thereby to wiper the surface of the housing to remove contaminants therefrom.

Advantageously, in this way, optimal performance of the sensor is ensured, irrespective of weather or other environmental conditions.

Optional step 720 comprises configuring the drive system 20 to drive the moveable part thereby to cause movement of the at least one wiper 40 to a parking region which does not interfere with a sensing function of the sensor 1000. That is, the method may comprise parking the wiper 40 in a parking region 200.

The skilled person will appreciate that the wiper assembly 10 may be retrofitted to a sensor (that is, an existing sensor) provided on a vehicle. The wiper assembly 10 may be provided as a retrofit kit of parts. A method may therefore comprise retrofitting a sensor 1000 with the wiper assembly 10. Alternatively, a sensor 1000 may already be provided with a wiper assembly, but not configured to perform the method of driving the moveable part 30, thereby to cause movement of the at least one wiper at least partially around the housing thereby to wiper the surface of the housing to remove contaminants therefrom. The method may therefore comprise reconfiguring a wiper assembly to perform the method according to the present invention. In particular, the method may comprise reconfiguring the existing wiper assembly to park the wiper in a dedicated region of the sensor. The dedicated region of the sensor may be a region of the sensor in which the sensor can sense, but is dedicated as a non-sensing region. This is highly advantageous as it allows such a region to be ignored during sensing, so that the presence of the wiper does not impact or interfere with the sensing function.

Although a few preferred embodiments of the present invention have been shown and described, it will be appreciated by those skilled in the art that various changes and modifications might be made without departing from the scope of the invention, as defined in the appended claims.

Although the examples have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example may be combined with features of any other embodiment, as appropriate, except where such combinations are mutually exclusive. Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A wiper assembly for removing contaminants from a surface of a housing provided around a sensor, comprising:
    a drive system;
    a moveable part connected to the drive system to be driven by the drive system, wherein the moveable part forms a ring and is configured to be provided above the housing of the sensor; and
    at least one wiper connected to the moveable part, wherein the at least one wiper extends downwardly from the moveable part,
    wherein the drive system is configured to drive the moveable part, thereby to cause movement of the at least one wiper at least partially around the housing thereby to wipe the surface of the housing to remove contaminants therefrom,
    wherein the moveable part is connected to the drive system at a location which is above the housing of the sensor;
    the moveable part comprising a first region and a second region, the first region comprising gear teeth, the at least one wiper rigidly connected to the second region at a top end and unconnected at a bottom end; and
    the drive system comprising a motor and a drive gear engaged with the gear teeth.

2. The wiper assembly according to claim 1, wherein the drive system is configured to drive the moveable part, thereby to cause movement of the at least one wiper to a parking region which does not interfere with a sensing function of the sensor.

3. The wiper assembly according to claim 2, wherein at least one of:
    the parking region corresponds with a dedicated region of the sensing function of the sensor which is not used for sensing,
    the parking region is a dedicated region of one or both of:
        the housing, and
        a path of movement of the at least one wiper that is associated with the dedicated region of the sensing function of the sensor which is not used for sensing.

4. The wiper assembly according to claim 1, wherein the wiper assembly contains one wiper.

5. The wiper assembly according to claim 1, wherein the at least one wiper is rigidly connected to the moveable part.

6. The wiper assembly according to claim 1, wherein the moveable part extends in a first direction and the wiper extends in a second direction.

7. The wiper assembly of claim 6, the first direction being a horizontal direction in use and the second direction being a vertical direction in use.

8. The wiper assembly according to claim 1, wherein the drive system is configured to cause the moveable part to perform a 360-degree rotation, thereby to cause movement of the at least one wiper completely around the housing thereby to wipe the surface of the housing to remove contaminants therefrom.

9. The wiper assembly according to claim 1, wherein the wiper assembly comprises a first detector configured to detect an arrangement of the moveable part.

10. The wiper assembly according to claim 1, further comprising a control system having a second detector for detecting the presence of contaminants on the sensor housing, the control system arranged to:
control the drive system to drive the moveable part, thereby to cause movement of the at least one wiper, in response to a signal from the second detector indicating the presence of contaminants on the sensor.

11. A sensor assembly comprising:
a sensor having a housing;
the wiper assembly according to claim 1.

12. The sensor assembly of claim 11, wherein the sensor is a sensor that is capable of emitting a first signal and receiving a second signal related to that first signal, in order to perform a sensing function.

13. The sensor assembly of claim 12, the sensor being a Light Detection and Ranging (LIDAR) sensor.

14. A vehicle comprising the sensor assembly of claim 11.

15. The vehicle of claim 14, the vehicle being an at least partially autonomous vehicle.

16. A vehicle comprising the wiper assembly of claim 1.

17. A vehicle according to claim 16, wherein the wiper assembly, or a sensor assembly including the wiper assembly, is arranged to receive control signals for controlling the drive system, the control signals being provided by one or more of:
a) a second detector for detecting presence of contaminants on the sensor housing;
b) a manual input provided at the vehicle;
c) a input from a user of the vehicle; or
d) a further system provided at the vehicle to which the wiper assembly or sensor assembly is arranged to receive control signals from.

18. The vehicle of claim 16, the vehicle being an at least partially autonomous vehicle.

19. A method of operating a wiper assembly for removing contaminants from a surface of a housing provided around a sensor, the wiper assembly comprising:
a drive system;
a moveable part connected to the drive system to be driven by the drive system, wherein the moveable part forms a ring and is configured to be provided above the housing of the sensor, wherein the moveable part is connected to the drive system at a location which is above the housing of the sensor; and
at least one wiper connected to the moveable part, wherein the at least one wiper extends downwardly from the moveable part;
the moveable part comprising a first region and a second region, the first region comprising gear teeth, the at least one wiper rigidly connected to the second region at a top end and unconnected at a bottom end; and the drive system comprising a motor and a drive gear engaged with the gear teeth; and
the method comprising:
driving the moveable part at a location which is above the housing of the sensor, thereby to cause movement of the at least one wiper at least partially around the housing thereby to wipe the surface of the housing to remove contaminants therefrom.

* * * * *